Patented Apr. 15, 1941

2,238,243

UNITED STATES PATENT OFFICE 2,238,243

LIQUID COATING COMPOSITION

Crayton Knox Black, Wilmington, Del., assignor to E. I. du Pont de Nemours & Company, Wilmington, Del., a corporation of Delaware No Drawing. Application December 28, 1939, Serial No. 311,307

1 Claim. (Cl. 134—39)

This invention relates to liquid coating compositions. More particularly this invention deals with paints, varnishes and lacquers of a blue to green shade characterized by improved stability against bronzing.

This invention has as an object the production of new coating compositions which will not bronze on exposure to weather. A further object is the production of blue to green liquid coating compositions which are fast to light, acid, alkali, baking, etc. A still further object is the production of a blue to green paint which will not change shade during storage in the can.

Paints, lacquers and varnishes of blue to green shade are generally made by incorporating a suitable pigment of the desired shade in the usual organic vehicles for this type of coating composition. The customary colors heretofore employed have been the iron blues, ultramarine, and more recently the pigments of the phthalocyanine series. It has been observed, however, that these colors suffer badly from the defect known as bronzing. When a painted surface with these colors has been exposed to weather for some time, the original uniform color becomes deteriorated in spots and shows a bronzing or reddish sheen of disagreeable appearance. This effect is believed due to disintegration of the surface film of the binder, thus creating a pigment-air interface which, in the case of blues, is usually bronzy. Iron blues (e. g. Prussian blue, Chinese blue, etc.) and copper phthalocyanine are particularly bad in this respect. Ultramarine on the other hand is very fugitive to light.

Another common defect of these pigments is can-fading, that is, gradual loss of strength when packed and stored in cans. In the case of iron blues the color generally loses color strength in the can by reduction, but regains it by air-oxidation after it has been applied to a surface. Copper-phthalocyanine on the other hand seems subject to the effects of crystal growth in the paint solvent. This is especially manifest where the solvent is thinned with the usual hydrocarbon thinners, such as turpentine. The larger pigment particles which form have less tinctorial value than the pigment originally incorporated in the paint, as a result of which the paint seems to lose color strength. As a result of the above two difficulties, coloring matters of the phthalocyanine series have found but little application in the paint, varnish and lacquer industries, in spite of their otherwise valuable qualities such as fastness to light, heat, acid and alkali.

I have now found that surprisingly stable liquid coating compositions, both as to bronzing and as to can-fading, may be obtained by using as coloring matter a lake of the phthalocyanine series of the type obtainable by precipitating sulfonated metallic or metal-free phthalocyanines by the aid of lake forming salts, such as those of barium, aluminum, magnesium or strontium. These compounds per se are not novel, having been described and claimed in U. S. Patents Nos. 2,099,689 and 2,099,690. But their application to the purpose aforementioned appears to be novel, especially in view of their remarkable stability above noted. This latter quality is particularly surprising when one considers the close kinship of these lake-compounds to copperphthalocyanine. Indeed, I find that sulfonated copper-phthalocyanine itself may be employed as a basis for the lakes which are to be used according to this invention.

This invention is best illustrated, but not limited, by the following examples in which the parts are by weight.

Example 1

A lake containing 20% color was made by precipitating with barium chloride, in the presence of washed alumina hydrate, sulfonated copper phthalocyanine containing approximately two sulfonic acid groups per molecule. The lake was filtered, washed and dried. This lake was ground into a standard rosin-linseed oil varnish by ball milling for 40 hours. (The standard rosin-linseed oil varnish consists of linseed-oil, rosin, and turpentine as thinner.) The resultant paint was painted on auto body steel panels and exposed out-of-doors at an angle of 45° south. At the end of one year there was no evidence of bronzing. Under these same conditions a similar paint, pigmented with copper phthalocyanine exhibited a very bad reddish bronze which is most undesirable in a paint.

Example 2

Sulfonated copper phthalocyanine as in Example 1 was precipitated from a water solution with barium chloride, in the absence of alumina hydrate. This pigment when used in paint exhibited the same excellent non-bronzing properties as that of Example 1.

Example 3

Sulfonated copper phthalocyanine was precipitated as in Example 1 on zinc oxide instead of alumina hydrate. The resultant paint was a blue tint which showed no bronzing on prolonged out-door exposure. This paint further showed no tendency to fade when stored in a paint can. A similar paint in which copper phthalocyanine is used with zinc oxide will generally fade to approximately 50% of its original strength on simply standing in the can for a prolonged period of time, especially if a hydrocarbon thinner is present in the solvent. In other words, with copper phthalocyanine a paint will show only a fraction of its original strength after standing in the can for several months. This is not the case with the lakes of sulfonated phthalocyanines.

*Example 4*

The pigment of Example 2 was ground into an alkyd resin vehicle. The resultant paint showed the same excellent non-bronzing properties.

In a similar manner other lakes of sulfonated phthalocyanines may be used with good advantage. The calcium, strontium and magnesium salts have been used instead of barium with equal satisfaction. In fact, any insoluble metal salt of sulfonated phthalocyanine may be used.

In place of sulfonated copper phthalocyanine, the sulfonic acids of other metallic phthalocyanines, for instance those of iron, nickel, lead or aluminum phthalocyanine or of metal-free phthalocyanine may be used.

The degree of sulfonation of the phthalocyanine may be varied over wide limits. For example successful results have been obtained with pigments made from sulfonated phthalocyanines which analyzed 1.34, 2.05, 2.8 and 3.45, sulfonic acid groups per molecule, respectively.

Other white or colored bases or extenders may be used. For example, the following have been found satisfactory; antimony oxide; titanium oxide, either alone or in combination with barium sulfate or calcium sulfate.

Any of the known paint, varnish or lacquer vehicles may be used, for instance, nitrocellulose lacquers, linseed oil, Dulux, Bakelite lacquers (liquid phenol-formaldehyde condensation products), etc. Natural or synthetic resins may of course be present. Cellulose derivative lacquers, phenol-formaldehyde, urea-formaldehyde, etc. may be used in place of the types given in the examples.

The proportions of colored pigment to white or extender pigment may be varied over wide limits depending on the depth of shade desired. The degree of pigmentation of the composition may be varied over wide limits.

It will be clear from the above illustrations that my invention permits the production of liquid coating compositions showing the advantages of one pigmented with phthalocyanines (light fastness, fastness to acids, alkalis, etc.) but not the disadvantage of bronzing on exposure which is characteristic of blues in general and phthalocyanine pigment dyestuff in particular. My invention further permits the production of can-stable paints of phthalocyanine shades and properties.

I claim:

A can-stable, non-bronzing, non-aqueous liquid coating composition of the group consisting of oil and resinous paints, varnishes and lacquers, said coating composition containing as principal color constituent the lake obtained by precipitating, with barium chloride and in the presence of alumina hydrate, sulfonated copper phthalocyanine containing from 1.34 to 3.45 sulfo groups per molecule.

CRAYTON KNOX BLACK.